United States Patent [19]

Haushalter et al.

[11] Patent Number: 5,200,187
[45] Date of Patent: Apr. 6, 1993

[54] MOLYBDENUM PHOSPHATE COMPOSITIONS

[75] Inventors: Robert C. Haushalter, Little York; Linda A. Mundi, Lake Hopatcong, both of N.J.

[73] Assignee: Exxon Research and Engineering Company, Florham Park, N.J.

[21] Appl. No.: 761,536

[22] Filed: Sep. 18, 1991

[51] Int. Cl.$^5$ ................. C01B 25/37; C07F 11/00
[52] U.S. Cl. ........................ 423/308; 423/309; 423/311; 556/13; 556/14; 556/28
[58] Field of Search ................... 556/26, 13, 14, 28; 423/308, 309, 311

[56] References Cited

U.S. PATENT DOCUMENTS

| | | | |
|---|---|---|---|
| 4,376,709 | 3/1983 | Johnson et al. | 556/28 |
| 4,846,853 | 7/1989 | Chang et al. | 423/308 |
| 4,956,483 | 9/1990 | Corcoran, Jr. et al. | 556/14 |

Primary Examiner—Wayne Langel
Attorney, Agent, or Firm—Ronald D. Hantman

[57] ABSTRACT

A class of new oxide structures containing octahedral molybdenum and tetrahedral phosphorous has been generated using hydrothermal techniques. These materials are produced by the reaction of a molybdenum oxide source with phosphate and any one, or combination of organic cation/alkali-metal cation/organic amine as a templating/mineralizing agent. A reducing agent is necessary to convert the Mo(VI) to a lower valent form and can be either added to the reaction mixture or is provided in the form of one of the reactants.

4 Claims, 2 Drawing Sheets

MOLYBDENUM PHOSPHATE COMPOSITIONS

BACKGROUND OF THE INVENTION

The present invention relates to new oxide structures which contain octahedral molybdenum and tetrahedral phosphorous combined with transition and/or post-transition metal cations.

Structured, microporous oxides are utilized in a multitude of catalytic and sorption/separation processes in the petroleum and petrochemical industry. The most widely known group of materials that falls within this category are the aluminosilicate zeolites, see Breck, D.W., "Zeolite Molecular Sieves"; Wiley: New York, 1984. A second generation of molecular sieves, high-silica zeolites, were later introduced through the use of organic cations instead of alkali-metal bases traditionally used in zeolite synthesis gels, see Barrer, R.M., Denny, P.J., J. Chem. Soc. 1961, 83, 4675. Recently, a major group of new microporous materials, the aluminophosphates, and related silicoaluminophosphates and metalloaluminophosphates, were also synthesized using organic templating species, see Wilson, S.T., Lok, B.M., Messina, C.A., Cannan, T.R., Flanigen, E.M., J. Am. Chem. Soc. 104, 1147, Lok, B.M., Messina, C.A., Patton, R.L., Gajek, R.T., Cannan, T.R.; Flanigen, E.M., U.S. Pat. No. 4,440,871, 1984, J. Am. Chem. Soc. 1984. 106, 6092, and Messina, C.A., Lok, B.M.; Flanigen, E.M., U.S. Pat. No. 4,544,143, 1985. This latter group of materials demonstrates two very important factors concerning molecular sieves: (1) that three-dimensional microporous materials can crystallize from highly acidic reaction media and (b) components other than silicon and aluminum can be used to generate porous oxide frameworks (in this case, phosphorous, and a variety of different metals).

In addition to all of these tetrahedral framework materials discussed above, there are also other classes of structured microporous solids that contain octahedrally coordinated lattice components as well. These include a previous patent on microporous molybdenum phosphates with organic and alkali metal cations (see U.S. Pat. No. 4,956,483) and a class of microporous molybdenum phosphates based on the Mo₂P₃O₁₂(OH)₂¹⁻ framework (see U.S. Pat. application Ser. No. 648,714). The present invention is also a class of compounds that include octahedral molybdenum and tetrahedral phosphorus. The materials of the present invention differ from the materials described in U.S. Pat. No. 4,956,483 in that transition elements are present in stoichiometric amounts and form an integral part of the covalent three dimensional lattice, i.e., the transition elements bond the molybdenum phosphate portions of the framework together.

Another class of octahedral-tetrahedral framework materials, based on titanium silicates and titanium aluminosilicates, have recently been disclosed in the patent literature, e.g., U.S. Pat. No. 4,853,202 but are obviously compositionally unrelated to the present materials.

The compositions of the present invention are related to zeolites and other microporous materials because they have channels or interlayer spaces capable of reversibly sorbing molecules.

SUMMARY OF THE PRESENT INVENTION

The present invention is a composition of matter having the formula:

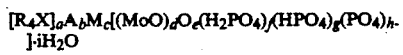

where a—i=greater than or equal to zero and not necessarily integers; where R =H, phenyl, $C_nH_{2n+1}$, or combinations thereof, where n is an integer greater than or equal to 0 and less than or equal to 3; where X =N, P or As; where A =Li, Na, K, Rb, Cs, Tl, Mg, Ca, Sr, Ba, NH₄, H₃O or combinations thereof; where M is a transition element or cation from main group elements such as Al³⁺, In³⁺, or combinations thereof. Mo is in an oxidation state of less than or equal to 5+.

DESCRIPTION OF THE PREFERRED EMBODIMENT

Figure 1:
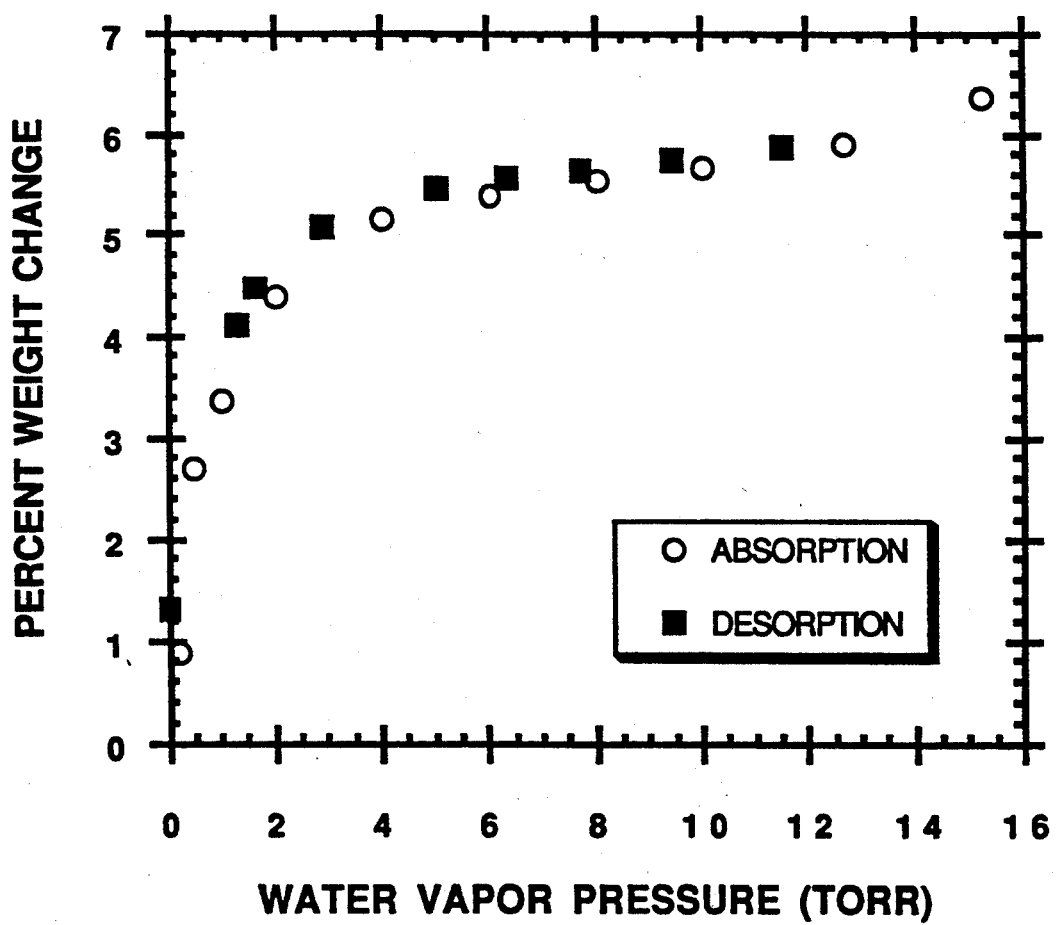
FIG. 1 shows a water absorption isotherm for a composition of Example 1.

The present invention is a new class of molybdenum and phosphorous compositions which are synthesized at low pH and in the presence of organic or inorganic templating agents. These new compositions are framework oxides containing molybdenum and phosphorous oxides as lattice constituents. These materials resemble zeolites in that they appear to be metastable, anionic frameworks produced from cation-directed syntheses and are capable of cation exchange.

The compositions of the class of the present invention contain an alkali-metal and/or an organic cation, molybdenum, oxygen and phosphorus. The oxidation state of molybdenum is between six and three, with five being ideal. There are no P-O-P linkages within the lattices and the molybdenum centers are all in an octahedral or distorted octahedral environment of oxygen.

The materials are usually prepared from the hydrothermal treatment of a molybdenum oxide source (molybdenum oxide, molybdic acid, ammonium molybdate alkali-metal molybdate, etc.) and phosphate (usually phosphoric acid) in the presence of any one, or combination of organic cation/alkali-metal cation/organic amine as a templating/mineralizing agent. A reducing agent is necessary to convert he Mo(VI) to a lower valent form (to avoid the formation of Keggin-ion type polyoxo anions which are typical of Mo⁺⁶); it can either be added to the reaction mixture (using something such as a stoichiometric amount of molybdenum metal) or is provided in the form of one of the reactants. Reactions take place at low to moderate pH and autogenous pressures, with crystallization temperatures between 100° C. and 500° C., for periods of up to two weeks. Large amounts of highly crystalline, monophasic material usually result from this procedure. The phase that results from a synthesis is usually determined by the cation(s) and/or temperatures employed.

Alternately, these materials can sometimes be crystallized at room temperature from the aqueous filtrate when the above components are refluxed at atmospheric pressure followed by filtration. These specific structures tend to be held together by a higher amount of hydrogen bonds and contain more hydroxyl groups.

EXAMPLES

EXAMPLE 1—Preparation and structural determination of:

[(CH$_3$)$_4$N]$_2$(NH$_4$)$_2$Fe$_2$[(MoO)$_{12}$O$_{18}$(HPO$_4$)$_2$(H$_2$PO$_4$)$_6$]·9H$_2$O The reaction of Na$_2$MoO$_4$, Mo, FeCl$_3$, [CH$_3$)$_4$N]OH, (NH$_4$)$_2$HPO$_4$, H$_3$PO$_4$ and H$_2$O in a mole ratio of 5:1:1:7:2:16:150 at 200° C. for 65 hours gives a 94% yield of single phase material. The pH before heating was ca. 4.

The structure can be described by the following coordinates which were determined from a single crystal x-ray diffraction study. The actual composition of the material as given above is the correct one determined from elemental analysis. In the listing of the atomic coordinates below, all of the solvate O atoms as well as the ammonium N atoms are all listed as N's (the atomic scattering factors for O and N are so similar that they cannot be resolved by the x-ray diffraction experiment and also because both O and N atoms are disordered over the same sites).

| Space Group R3-bar m (Hexagonal Setting) a = 12.433, b = 12.433, c = 37.013Å α = β = 90°, γ = 120° | | | |
|---|---|---|---|
| Mo1 | −0.02368 | 0.23189 | −0.43753 |
| Fe1 | 0.0 | 0.0 | −0.5000 |
| Fe2 | 0.33333 | 0.66667 | −0.3333 |
| P1 | 0.19425 | 0.38851 | −0.37662 |
| P2 | 0.0000 | 0.00000 | −0.39496 |
| O1 | −0.08479 | 0.08479 | −0.47053 |
| O2 | 0.07861 | 0.36072 | −0.39857 |
| O3 | 0.14661 | 0.29323 | −0.34267 |
| O4 | −0.14980 | 0.14980 | −0.40082 |
| O5 | 0.06579 | 0.13157 | 0.41114 |
| O6 | 0.147 | 0.2940 | −0.46357 |
| O7 | −0.06133 | 0.32345 | −0.45857 |
| O8 | 0.26144 | 0.52288 | −0.36333 |
| O9 | 0.0000 | 0.000 | −0.35523 |
| O1 | 0.00000 | 0.00000 | −0.14417 |
| O2 | −0.12483 | −0.24967 | −0.32529 |
| O3 | −0.13325 | −0.26650 | −0.72639 |
| O4 | 0.000 | 0.0000 | −0.71281 |
| C1 | 0.0000 | 0.0000 | −0.18739 |
| C2 | 0.06891 | −0.06891 | −0.13379 |

Example 2—Preparation and structural determination of:

[(CH$_3$)$_4$N]$_2$Na$_2$Fe$_3$[(MoO)$_{12}$O$_{18}$(HPO$_4$)$_2$(H$_2$PO$_4$)$_6$]·16H$_2$O The reaction of Na$_2$MoO$_4$, Mo, FeCl$_3$, [(CH$_3$)$_4$N]OH, H$_3$PO$_4$ and H$_2$O in a mole ratio of 5:1:1:8:18:250 at 200° C. for 69 hours gives a 62% yield of single phase material.

The structure can be described by the following coordinates which were determined from a single crystal x-ray diffraction study.

| Space Group P1-bar a = 12.724, b = 13.841, c = 12.702Å α = 109.38, β = 119.21, γ = 83.40° | | | |
|---|---|---|---|
| Mo1 | 0.7580 | 0.6743 | 0.5422 |
| Mo2 | 0.7671 | 0.6798 | 0.3452 |
| Mo3 | 1.0463 | 0.6830 | 0.3544 |
| Mo4 | 1.2435 | 0.6828 | 0.5598 |

| -continued Space Group P1-bar a = 12.724, b = 13.841, c = 12.702Å α = 109.38, β = 119.21, γ = 83.40° | | | |
|---|---|---|---|
| Mo5 | 1.2304 | 0.6698 | 0.8234 |
| Mo6 | 1.0238 | 0.6664 | 0.8168 |
| Fe1 | 1.3133 | 1.0558 | 0.9908 |
| Fe2 | 1.0000 | 0.5000 | 0.5000 |
| P1 | 1.4055 | 0.8479 | 0.8524 |
| P2 | 0.8417 | 0.8537 | 0.2602 |
| P3 | 0.8172 | 0.8332 | 0.8297 |
| P4 | 1.0191 | 0.7967 | 0.6239 |
| Na1 | 1.433 | 0.9434 | 0.507 |
| O1 | 0.874 | 0.612 | 0.261 |
| O2 | 1.089 | 0.624 | 0.242 |
| O3 | 0.956 | 0.795 | 0.275 |
| O4 | 1.371 | 0.796 | 0.709 |
| O5 | 1.350 | 0.953 | 0.8670 |
| O6 | 1.366 | 0.783 | 0.904 |
| O7 | 1.542 | 0.860 | 0.931 |
| O8 | 1.384 | 0.975 | 1.114 |
| O9 | 1.309 | 0.605 | 0.921 |
| O10 | 0.928 | 0.772 | 0.889 |
| O11 | 0.946 | 0.752 | 0.669 |
| O12 | 0.875 | 0.959 | 0.370 |
| O13 | 0.851 | 0.596 | 0.676 |
| O14 | 0.624 | 0.613 | 0.471 |
| O15 | 0.742 | 0.786 | 0.686 |
| O16 | 0.866 | 0.942 | 0.855 |
| O17 | 0.753 | 0.796 | 0.270 |
| O18 | 0.954 | 0.756 | 0.474 |
| O19 | 1.147 | 0.754 | 0.673 |
| O20 | 1.293 | 0.604 | 0.693 |
| O21 | 1.172 | 0.788 | 0.480 |
| O22 | 1.331 | 0.624 | 0.498 |
| O23 | 0.638 | 0.619 | 0.232 |
| O24 | 0.837 | 0.586 | 0.447 |
| O25 | 0.727 | 0.784 | 0.466 |
| O26 | 0.785 | 0.875 | 0.132 |
| O27 | 0.740 | 0.847 | 0.893 |
| O28 | 1.152 | 0.963 | 0.921 |
| O29 | 1.083 | 0.580 | 0.697 |
| O30 | 1.156 | 0.772 | 0.907 |
| O31 | 1.023 | 0.912 | 0.671 |
| O32 | 1.097 | 0.593 | 0.458 |
| O33 | 1.055 | 0.600 | 0.913 |
| O34 | 0.934 | 1.151 | 0.843 |

Figure 2:
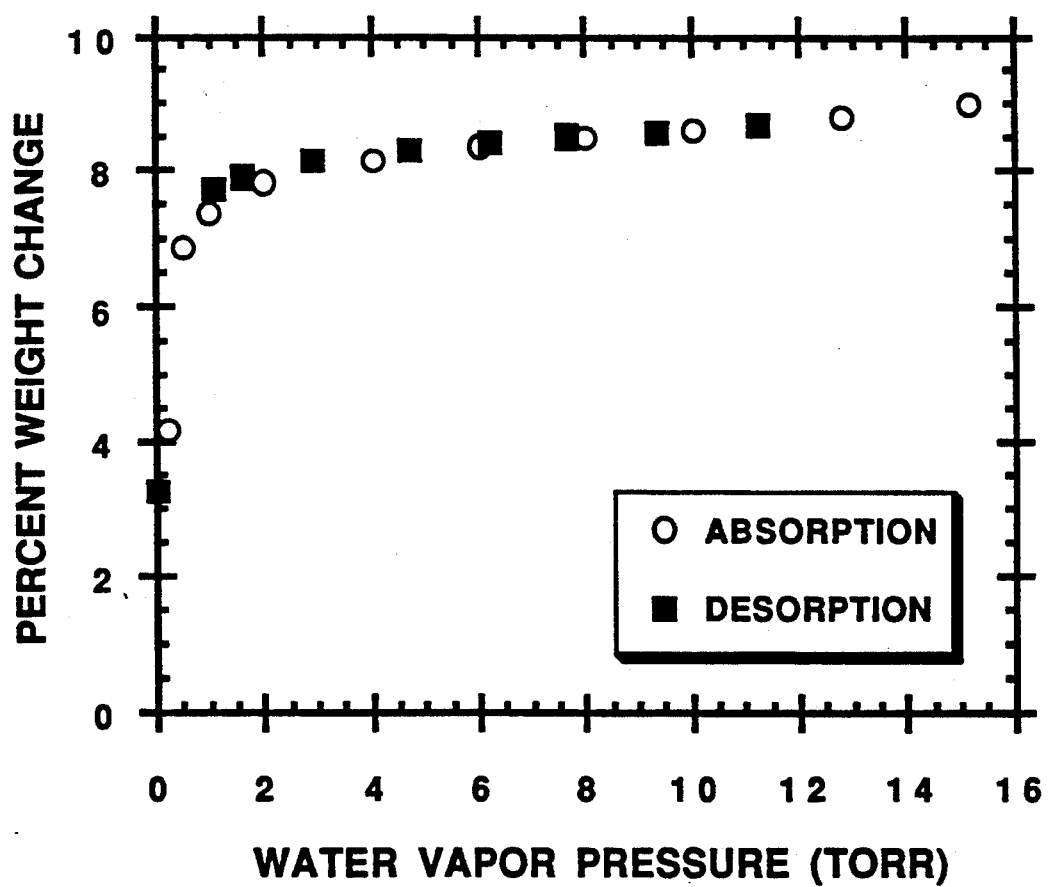
FIG. 2 shows a water absorption isotherm for a composition of Example 2.

FIGS. 1 and 2 show water absorption isotherms for the materials of Example 1 and 2, respectively. These absorption isotherms demonstrate: (a) the shape of the isotherm (Type 1) shows that the molecules sorbed (in this case H$_2$O) use filling micropores that are similar in size to the sorbate and (b) the weight percent absorbed shows how much internal void volumes can be filled.

Example 3—Preparation and Structral Determination of:

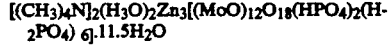
[(CH$_3$)$_4$N]$_2$(H$_3$O)$_2$Zn$_3$[(MoO)$_{12}$O$_{18}$(HPO$_4$)$_2$(H$_2$PO$_4$)$_6$]·11.5H$_2$O The reaction of Na$_2$MoO$_4$, Mo, ZnO, [(CH$_3$)$_4$N]OH, H$_3$PO$_4$, and H$_2$O in a mole ratio of 2:1: 1:7:18:500 at 200° C. for 138 hours gives a 70% yield of product that is slightly intermixed with excess molybdenum metal.

The structure can be described by the following coordinates which were determined from a single crystal x-ray diffraction study.

| Space Group C2/m a = 24.908, b = 13.036, c = 13.402Å α = 90, β = 98.83, γ = 90° | | | |
|---|---|---|---|
| Mo1 | 0.08909 | 0.23240 | 0.9617 |
| Mo2 | 0.06432 | 0.1348 | 0.7933 |

| Space Group C2/m<br>a = 24.908, b = 13.036, c = 13.402Å<br>α = 90, β = 98.83, γ = 90° | | |
| --- | --- | --- |
| Mo3 | 0.11799 | 0.09890 | 1.1895 |
| Zn1 | 0.23890 | 0.00000 | 0.8249 |
| Zn2 | 0.00000 | 0.00000 | 1.0000 |
| P1 | 0.13490 | 0.00000 | 0.6504 |
| P1 | 0.1518 | 0.0000 | 0.9678 |
| P3 | 0.3010 | −0.2150 | 0.8686 |
| O1 | 0.1059 | 0.0953 | 0.6773 |
| O2 | 0.1921 | 0.0000 | 0.696 |
| O3 | 0.1313 | 0.0000 | 0.535 |
| O4 | 0.0182 | 0.0000 | 0.751 |
| O5 | 0.1290 | 0.2108 | 0.8492 |
| O6 | 0.0341 | 0.1231 | 0.9196 |
| O7 | 0.1391 | 0.0948 | 1.0272 |
| O8 | 0.0697 | 0.2118 | 1.1078 |
| O9 | 0.11350 | 0.0000 | 0.8640 |
| O10 | 0.0617 | 0.0000 | 1.130 |
| O11 | 0.1776 | 0.0000 | 1.213 |
| O12 | 0.2108 | 0.0000 | 0.955 |
| O13 | 0.0535 | 0.34300 | 0.935 |
| O14 | 0.3406 | −0.1968 | 0.9670 |
| O15 | 0.0215 | 0.2180 | 0.7263 |
| O16 | 0.3234 | −0.2889 | 0.7977 |
| O17 | 0.2886 | −0.1116 | 0.815 |
| O18 | 0.0995 | 0.122 | 1.302 |
| O19 | 0.2495 | −0.271 | 0.899 |
| O20 | 0.338 | 0.000 | 0.061 |
| O21 | 0.76200 | 0.500 | 0.141 |
| O22 | 0.536 | 0.458 | 0.450 |
| O23 | 0.066 | 0.230 | 0.504 |
| O24 | 0.250 | 0.250 | 0.500 |
| O25 | 0.833 | 0.386 | 0.268 |
| O26 | 0.221 | 0.000 | 0.436 |
| N1 | 0.0609 | 0.5000 | 0.243 |

What is claimed is:

1. A compound having the formula:

$$[R_4X]_aA_bM_c[(MoO)_dO_e(H_2PO_4)_f(HPO_4)_g\cdot iH_2)]$$

wherein a, b, e, and i are greater than or equal to zero and c, d, and at least one of f and g is greater than zero and not necessarily integers; R=H, phenyl, $C_nH_{2n+1}$, or combinations thereof, n is an integer greater than or equal to 0 and less than or equal to 3; where X=N, P or As; A=Li, Na, K, Rb, Cs, Tl, Mg, Ca, Sr, Ba, $NH_4$, $H_3O$ or combinations thereof; M is a transition element or cation from main group elements, or combinations thereof, and P is tetrahedrally coordinated and Mo is octahedrally coordinated and is in an oxidation state of less than or equal to 5+.

2. The compound of claim 1 having the formula:
$[(CH_3)_4N]_2(NH_4)_2Fe_2[(MoO)_{12}O_{18}(HPO_4)_2(H_2PO_4)_6]\cdot 9H_2O$ 3. The compound of claim 1 having the formula:
$[(CH_3)_4N]_2Na_2Fe_3[(MoO)_{12}O_{18}(HPO_4)_2(H_2PO_4)_6]\cdot 16H_2O$ 4. The compound of claim 1 having the formula:
$[(CH_3)_4N]_2(H_3O)_2Zn_3[(MoO)_{12}O_{18}(HPO_4)_2(H_2PO_4)_6]\cdot 11.5H_2O.$

* * * * *